United States Patent [19]  [11] 4,424,869
vom Braucke et al.  [45] Jan. 10, 1984

[54] HAND TOOL WITH INTERSECTING PRONGED WHEELS

[76] Inventors: Hans vom Braucke, Karlstrasse 27, 4973 Vlotho; Manfred vom Braucke, Telgenbrink 105; Dieter Westerwelle, Markusstrasse 9, both of 4800 Bielefeld, all of Fed. Rep. of Germany

[21] Appl. No.: 328,030

[22] Filed: Dec. 7, 1981

[51] Int. Cl.³ ............................................. A01B 1/06
[52] U.S. Cl. .................................... 172/349; 172/548
[58] Field of Search ............... 172/349, 350, 378, 540, 172/548, 531, 520, 747, 81, 547

[56] References Cited

U.S. PATENT DOCUMENTS

| 2,664,040 | 12/1953 | Beard | 172/548 |
| 2,802,408 | 8/1957 | Seaman | 172/548 X |
| 3,094,174 | 6/1963 | Miller et al. | 172/531 |
| 3,605,907 | 9/1971 | Schuring et al. | 172/378 |
| 4,099,577 | 7/1978 | Beckham et al. | 172/747 X |

FOREIGN PATENT DOCUMENTS

| 118059 | 1/1944 | Australia | 172/349 |
| 2403728 | 5/1979 | France | 172/548 |

Primary Examiner—Richard T. Stouffer

[57] ABSTRACT

In a garden hand tool for loosening, cutting and crumbling garden soil or the like, comprising freely rotatable prong arrangements (17) in star-like formation which are arranged to face one another to form a "V" and the edges of which intersect one another because of the interengagement of the prong arrangements (17), thus forming cutting locations, these prong arrangements (17) are freely rotatably mounted on a bearing sleeve (12) and attached to a central axle (11) by means of a central aperture (12a). Between each bearing sleeve (12) which is slipped on the axle (11), a guide bearing (13) is also slipped over and clamped to the end of the axle (11) by an end bearing (14) and a nut (15). In such a case, the central apertures (12a) formed in the bearing sleeves (12) are disposed at an acute angle (at an inclination ) relative to the external bearing surface so as to correspond to the inclined position of the prong arrangements (17). A reinforcing plate (22) is mounted in the center of the axle (11), and an intermediate guide bearing (10a) is formed around the reinforcing plate (22), the guide bearing (10a) being made of plastics material and leads to a shaft socket (20) for accommodating a shaft (10).

6 Claims, 6 Drawing Figures

HAND TOOL WITH INTERSECTING PRONGED WHEELS

The present invention relates to a manually operable tool or device for loosening, cutting and crumbling garden soil.

DESCRIPTION OF PRIOR ART

U.S. Pat. No. 3,605,907 already discloses a manually operable tool of this type having freely rotating prongs in star-like arrangement and disposed on bearing axles which face one another in the form of a "V". The central radial planes of these prong stars, which have preferably a diamond-shaped cross-section and laterally located cutting edges on each prong, intersect one another at an acute angle so that the edges, which slide along each other, of the crosswisely interengaging prongs form cutting locations.

Such an arrangement has substantial advantages with regard to the breaking-up of clods and also has an advantageous selfcleaning action as a result of the scissor-like movement.

SUMMARY OF THE INVENTION

The present invention seeks to further improve these known advantageous manually operable devices, wherein two prong stars rotate freely on each available shaft, such an improvement, inter alia, reducing the risk of corrosion and the number of shafts as well as improving the bearing guidance of the prong stars and their interchangeability.

This object is achieved, with a hand tool of the abovementioned type, in that two or more bearing sleeves, which carry the star-like prong arrangements and guide bearings, which are disposed therebetween and are made of plastics material, are detachably mounted on a continuous, straight, central axle so as to be non-rotatable and displaceable in the longitudinal direction of the axle.

Thus according to the present invention there is provided in a hand tool for loosening, cutting and crumbling garden soil or the like, comprising a continuous, straight, central axle; at least two pronged wheel arrangements detachably mounted, via at least two bearing sleeves, on the central bearing axle to be freely rotatable and mounted facing one another to form V-like arrangements, with each said bearing sleeve carrying one of said pronged wheel arrangements; and guide bearings disposed between the bearing sleeves and made of plastics material, said bearing sleeves and guide bearings being detachably mounted on said central axle so as to be non-rotatable and displaceable in the longitudinal direction of the axle: and wherein the central radial planes of the pronged wheel arrangements intersect one another at an acute angle so that the edges of the crosswisely interengaging pronged wheel arrangements which slide along each other, form cutting locations.

The advantage of such an arrangement is that, when several pairs of bearing axles are provided, the number of metal guide bearing members is reduced and so is the risk of corrosion. These advantages may be further increased if, according to a preferred embodiment of the invention, the bearing sleeves carrying star-like prong arrangements are made of plastics material—the star arrangements being freely rotatably mounted on said bearing sleeves by means of inserted sliding bearing rings made of self-lubricating plastics material or the like.

Because the bearing sleeves and the intermediate guide bearings are displaceably mounted on the central axle, they may easily be removed from the axle in order to replace prong arrangements or bearing members, and be slipped on again. In such a case, it is preferable, according to the invention, to clamp or tighten the displaceable bearing members (bearing sleeves, intermediate guide bearings) one relative to the other by means of clamping or tightening nuts screwed onto their ends, so that the bearing members form, on the central axle, a rigid unit which is disposed on one shaft.

It is preferable to make the external surface of the bearing sleeve discontinuous by means of annular collecting channels and discharge conduits disposed at right angles thereto, in order to discharge to the outside the precipitating material, such as sand or the like, when the star prong arrangements are inserted into the soil.

The whole assembly of such manually operable devices, from the point of view of manufacture, can be accomplished rapidly and easily, so that a rational manufacture is provided.

Further details and embodiments are found in the subclaims.

The invention extends not only to the individual features, but also to combinations thereof.

BRIEF DESCRIPTION OF THE DRAWINGS

The invention will be described further, by way of example, with reference to the accompanying drawings in which.

DESCRIPTION OF THE PREFERRED EMBODIMENTS

Figure 1:
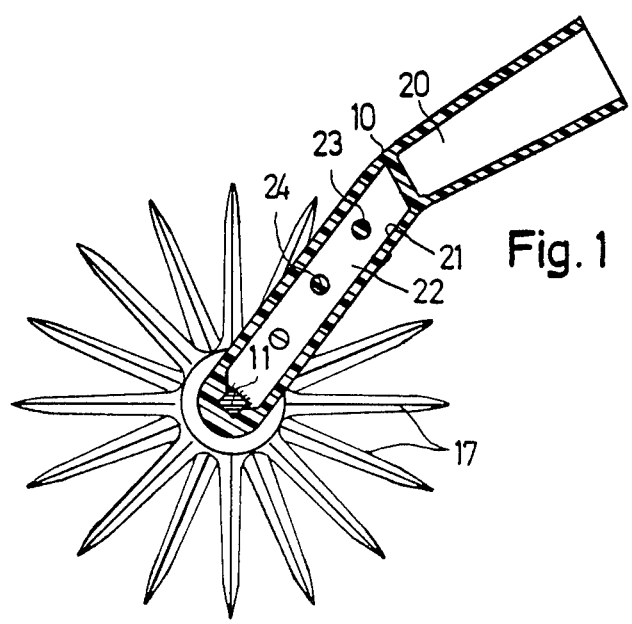
FIG. 1 is a side view of a hand tool having a shaft, shown in vertical section, and star-like pronged wheel arrangements mounted thereon.

A central axle 11 of square cross-section is secured to a shaft 10 by, for example, being welded thereto. Bearing sleeves 12, made of hard plastics material, face one another to form a "V" disposition and are arranged in pairs at corresponding angles (acute angles), the bearing sleeves 12 being slipped onto this central axle and having inserted therebetween guide bearings 13 which are also made of hard plastics material and the side faces of which also lie opposite one another in the form of a "V" and fully abut the side faces of the bearing sleeves 12. The side faces of the guide bearings 13 have small indentations therefor.

Central apertures 12a formed in the bearing sleeves 12 and guide bearings 13, as well as end bearings 14, are also of an angular or square construction to correspond to the square shape of the central axle 11 (rectangular), so that these bearing members 12, 13 and 14 are in fact displaceable in the longitudinal direction of the central axle 11, but they are non-rotatably mounted on the central axle 11. The abovementioned bearing members 12, 13, 14 are clamped together to form a substantially rigid unit by means of end nuts 15 which are rotatably mounted on end threads 16 of the central axle 11. In such a case, the external side faces of the end bearings 14 each abut the respective end nuts 15 at right angles.

Figure 2:
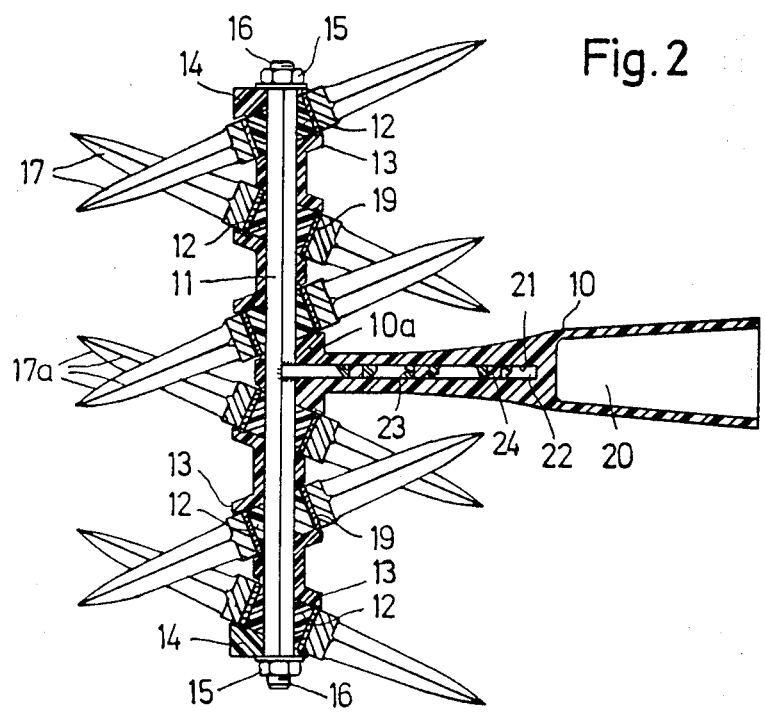
FIG. 2 is a horizontal section through the same shaft and through several pairs of pronged arrangements, the bearings of which face one another to form "V" arrangements and are disposed on a central axle.

Freely rotatable pronged wheels or star-like prong arrangements 17, made, for example, of a lightweight metal such as aluminum, are each diamond-shaped in cross-section and are provided with lateral cutting edges 17a. The star arrangements 17 are mounted so as to face one another on the bearing sleeves 12 in such a manner that they engage unilaterally in one another so as to slide on one another in a crosswise manner and thereby form pairs of advantageous cutting arrangements. The cutting arrangments lie opposite one another in an alternately offset manner with adjacent prong arrangements 17 (cf. FIG. 2).

For this purpose, every star arrangement 17 has a central bore 18, into which a slidable bearing ring 19, e.g. made of self-lubricating plastics material, is firmly inserted—the slidable bearing ring 19 being freely rotatably mounted on the round external surface of the bearing sleeve 12.

The guide bearings 13 are provided, on their wider external face, with a trough 13b which, on the one hand, forms a guide face for grass or the like and, on the other hand, substantially prevents grass or the like from directly entering the gaps between the guide bearing 13 and bearing 12; this therefore prevents the star arrangements 17 from becoming clogged-up.

The provision of the prong arrangements 17 with their bearings 12 on the central axle 11 provides the hand tool with an advantageous rigidity—especially also if a compacted soil is being worked.

The individual bearing members 12, 13, 14, as well as the prong arrangements 17, can be easily assembled and dismantled again, since the end screws 15 facilitate the attachment and clamping together of the individual members and their dismantling. The bearing members are prevented from rotating, while the prong arrangements 17 slide with the bearing sleeves 12 and slidable bearing ring 19—plastics material on plastics material.

The shaft 10, preferably made of a hard plastics material, has with its handle shaft socket 20, a longitudinal flat cavity 21 in its longitudinal direction on the axle side—a reinforcing plate 22 made of metal being inserted into this cavity 21 and being provided with central bores 23 for the formation of a plastics material bridge. The central axle 11 is rigidly connected to this reinforcing plate 23 by being welded on the end so that the shaft and axle 11 form a non-detachable unit.

The hand tool may be manufactured and assembled, for example, so that the reinforcing plate 22 is first welded, screwed or similarly attached in the middle of the central axle 11. The coating of plastics material forms an intermediate guide bearing 10a, which is V-shaped in cross-section, and is then sprayed both around the central axle 11 and around the reinforcing plate, whereby a handle shaft socket 20 is formed and the fluid plastics material flows through the bores 23 and forms bridges 24 therein to reinforce and advantageously secure in position the coating of plastics material and the reinforcing plate 22.

Figure 3:
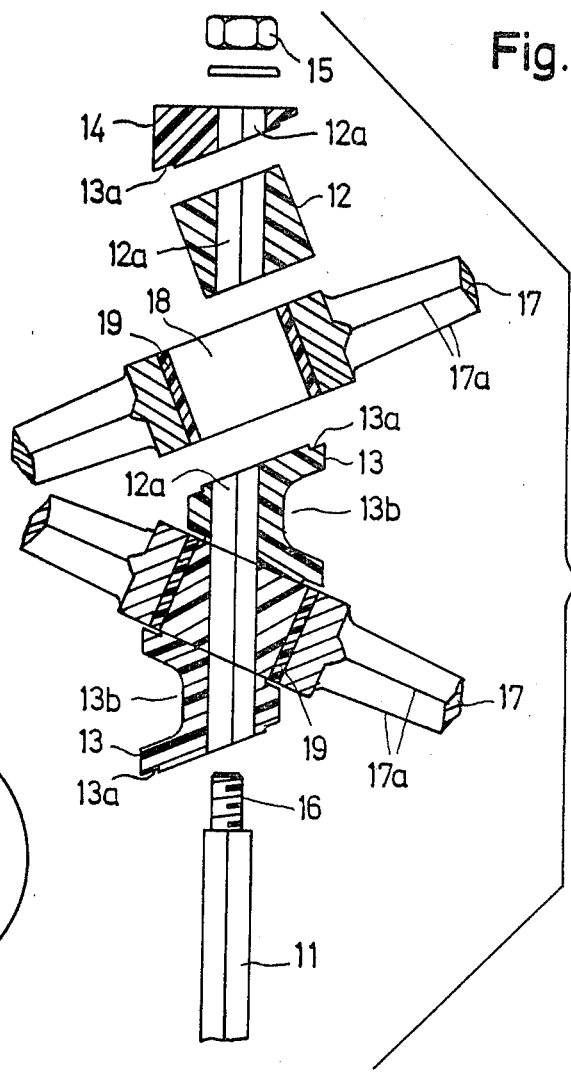
FIG. 3 is an exploded view showing bearings and intermediate guide bearings with a receiver bore formed therein for the central axle.

The bearing members (bearing sleeves 12 with the attached prong arrangements 17, intermediate guide bearings 13, end bearings 14) are then slipped on from each side and clamped together and relative to one another at their ends by means of tightening nuts 15 on the threads 16 (cf. FIG. 3).

The essential members of the hand tool are generally made of plastics material in order to eliminate a corrosive metal.

It therefore lies within the scope of the invention to manufacture the central axle 11 and the prong stars 17 from robust, hard plastics material also.

Figure 4:
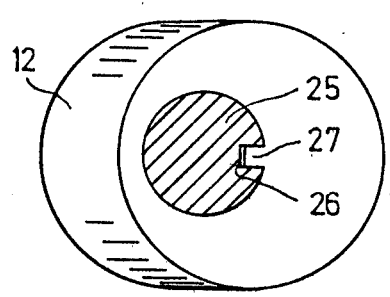
FIG. 4 is a cross-sectional view of a modified, round axle and a bearing sleeve attached thereto by a tongue and groove joint.

Instead of the many-sided central axle 11, a round axle 25 is provided in the embodiment shown in FIG. 4 of the drawing, the round axle 25 having a groove 26 formed therein which extends over its entire length.

In such embodiment, the pertinent central aperture 12a is provided with a web or tongue 27 so that the bearing sleeve 12, the guide bearing 13 and the end bearing 14 are prevented from rotating with the axle 25 by means of a groove and tongue joint.

Instead of the groove 26, a web, cam or the like may also be disposed on the round axle 25, whereby an appropriate recess is formed in each respective central aperture 12a and the members 12, 13, 14 are prevented from rotating on the round axle 25.

Figure 5:
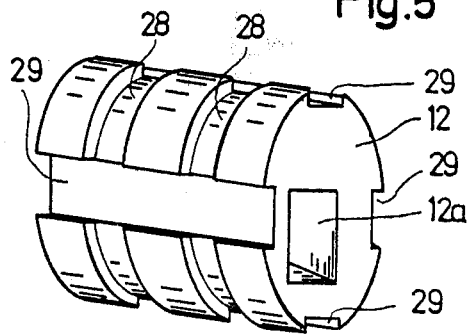
FIG. 5 is a perspective view of a modified bearing sleeve having grooves formed in the surface.
Figure 6:
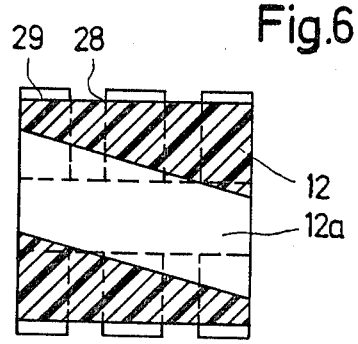
FIG. 6 is a vertical section through the bearing sleeve of FIG. 5.

In order to be able to deflect sand or the like precipitating between the sliding ring 19 and the bearing sleeve 12 as the soil is being prepared and in order to reduce the friction thereby, the surface of the bearing sleeve 12 is interrupted by annular collecting channels 28, grooves or the like, in which the sand is collected by the frictional face during the rotational movement of the prong arrangements 17, see FIGS. 5 and 6.

These annular collecting channels 28 discharge into discharge conduits 29 which are disposed at right angles to the collecting channels 28 and are distributed over the periphery of the bearing sleeves 12. Four discharge conduits 29 are provided in the embodiment. The sand or the like, which has started to collect in the collecting channels 28 is conducted to the outside by means of the discharge conduits 29.

A bearing sleeve which is designed in this manner therefore reduces the friction of the rotating prong arrangements and this has a favourable advantageous effect upon the operation and the service-life of the pronged wheels.

We claim:

1. A hand tool for loosening, cutting and crumbling soil or the like, comprising: a continuous, straight, central bearing axle of an angular construction, at least two pronged wheel arrangements having a central bore therein, a bearing sleeve detachably mounting each of said pronged wheel arrangements on the central bearing axle, to be freely rotatable and mounted facing one another to form V-like arrangements, a slidable bearing ring made of self-lubricating plastic material carried in the central bore formed in each respective pronged wheel arrangement, each bearing sleeve mounted to one of the bearing rings to carry one of said pronged wheel arrangements in a freely rotatable manner on the bearing sleeve, the external surfaces of the bearing sleeve being interrupted by means defining collecting channels and discharge conduits, guide bearings detachably mounted on said central bearing axle between the bearing sleeves and plastic end bearings detachably mounted on said central bearing axle, said bearing sleeves and guide bearing being non-rotatable and displaceable in the longitudinal direction of the axle and provided in a sleeve-like manner with a means defining an angular central aperture, and wherein the central radial planes of the pronged wheel arrangements intersect one another at an acute angle so that the edges of the crosswisely interengaging pronged wheel arrangements which slide along each other, form cutting locations.

2. A hand tool according to claim 1 further including a shaft formed of hard plastic material having a handle shaft socket formed in a first end thereof and a longitudinal flat cavity formed in a second end thereof and a reinforcing plate rigidly attached to the bearing axle and received within the longitudinal cavity of said shaft.

3. A hand tool according to claim 2, wherein an end of the reinforcing plate is welded to the bearing axle and said plastic shaft forms a fixed intermediate guide bearing, the reinforcing plate being provided with bores to form a plastics material bridge.

4. A hand tool according to claim 3 wherein the collecting channels extend annularly in the surface of the bearing sleeves.

5. A hand tool according to claim 4, wherein the discharge conduits extend at right angles to the collecting channels and extend parallel with the central axis of the bearing sleeve and are disposed in the surface of the bearing sleeve.

6. A hand tool according to claim 4, wherein the annularly extending collecting channels are disposed so as to discharge into the discharge conduits which are disposed at right angles thereto.

* * * * *